United States Patent
Yang

(10) Patent No.: US 8,403,808 B2
(45) Date of Patent: Mar. 26, 2013

(54) INDIVIDUAL-POWERED DUAL CVT DIFFERENTIAL SYSTEM WITH STABILIZING DEVICE

(76) Inventor: Tai-Her Yang, Dzan-Hwa (TW)

( * ) Notice: Subject to any disclaimer, the term of this patent is extended or adjusted under 35 U.S.C. 154(b) by 289 days.

(21) Appl. No.: 12/659,920

(22) Filed: Mar. 25, 2010

(65) Prior Publication Data

US 2011/0237387 A1    Sep. 29, 2011

(51) Int. Cl.
*B60W 10/02*  (2006.01)
*B60W 10/06*  (2006.01)
*B60W 10/08*  (2006.01)
*B60W 10/10*  (2012.01)

(52) U.S. Cl. ............................................. 477/5
(58) Field of Classification Search .............. 477/3, 5
See application file for complete search history.

(56) References Cited

U.S. PATENT DOCUMENTS 7,108,087 B2 *   9/2006   Imai ........................ 180/65.23
2008/0108476 A1 *   5/2008   Pagot et al. ..................... 477/5

* cited by examiner

*Primary Examiner* — Edwin A Young
(74) *Attorney, Agent, or Firm* — Bacon & Thomas, PLLC

(57) ABSTRACT

A multi-motor differential system for driving a common load includes two or more individual motors and CVTs installed between the individual motors and wheel groups subject to individual loads to achieve differential speed drive operation through speed ratio variation by the CVTs. The differential system also includes stabilizing device constituted by a torque-limited coupling device with sliding damping installed between the loads individually driven by the two CVTs.

16 Claims, 7 Drawing Sheets

INDIVIDUAL-POWERED DUAL CVT DIFFERENTIAL SYSTEM WITH STABILIZING DEVICE

BACKGROUND OF THE INVENTION (a) Field of the Invention

The present invention relates to two or more than two independent motors for driving individual loads coupled through a stabilizing device, the motors driving the individual loads through respective continuously variable transmissions (CVTs) individually installed between the individual motors and the individual driven loads to provide differential operation without the need for electronic feedback control. The stabilizing device is a dual-end shaft torque-limited coupling device connected between ends of the respective CVTs to operate synchronously when the torque transmitted between the two loads operates within the limited torque range, and operate differentially to produce sliding damping and stabilize the operation of the drive system when the torque transmitted between the two loads exceeds the limited torque range.

(b) Description of the Prior Art

Traditionally, when two or more loads are driven through differential speed regulation by a single motor, the differential speed function is often achieved by using differential wheel groups, resulting in shortcomings including transmission efficiency loss, excessive space used, and excessive weight. If a vehicle is driven by dual motors, two independent drive circuits are often installed, and the central control unit refers to parameters such as vehicle speed, output rotational speed detection device, steeling wheel shift values, road gradient, the center of gravity of the vehicle after loading, and processes for controlling the two independent drive circuits, and then the two independent drive circuits respectively drive the two motors according to a closed loop or semi-closed loop rotational speed control between the two motors for achieving a differential speed function, resulting in shortcomings including high cost and complex system operation.

SUMMARY OF THE INVENTION

The present invention relates to a system that uses multiple individual motors to drive a "common load" such as a vehicle, and in which CVTs are installed between the individual motors and respective wheel groups subject to individual loads to permit a rotational speed difference and to achieve differential speed drive operation through speed ratio variation by the CVTs, and that further includes a stabilizing device constituted by a torque-limited coupling device that uses sliding damping and is installed between the loads individually driven by the two CVTs, during driving operation, to stabilize the differential speed drive operation when the loads individually driven by the two CVTs vary, if a response time of clutch units at the loads individually driven by the two CVTs is slow, or if the two clutch units operate unstably because of a synchronous response time difference.

DESCRIPTION OF MAIN COMPONENT SYMBOLS

CCU100, CCU200, CCU300, CCU400: Central control unit
CL100, CL200, CL300, CL400: Clutch unit
CVT100, CVT200, CVT300, CVT400: Continuous variable transmission
ECU100, ECU200, ECU300, ECU400: Electric control unit
EMU100: Electric energy management unit
ESD100: Electric storage-discharge unit
FC100: Fuel control unit
G100: Generator
TCE100: Engine
L100, L200, L300, L400: Common load body
M100, M200, M300, M400: Motor
MI100, MI200, MI300, MI400: User interface
SD100: Engine speed detecting device
SDT100, SDT200: Stabilizing device
T100, T200, T300, T301, T400: Transmission
TANK100: Tank
W100, W200, W300, W301, W400, W401: Wheel group

DETAILED DESCRIPTION OF THE PREFERRED EMBODIMENTS

The present invention relates to differential system using multiple motors to drive individual wheel groups of a common load structure or body, in which a CVT is installed between each individual motor and a corresponding wheel group subject to an individual load, such that two or more than two motors installed on the common load structure individually drive the individual loads through the respective CVTs to obtain a rotational speed difference, and to achieve differential speed drive operation through the speed ratio variation provided by the CVTs. Furthermore, a stabilizing device constituted by a torque-limited coupling device with sliding damping is installed between the loads individually driven by the two CVTs so that during driving operation, if the loads individually driven by the two CVTs vary, if the response time of a clutch unit at the loads individually driven by the two CVTs is slow, or if the two clutch units operate unstably because of the synchronous response time difference thereof, the stabilizing device installed between the loads operates to stabilize the system.

The CVTs utilized by the present invention are continuously variable transmissions that can automatically change the speed ratio with the load state, or change the speed ratio upon receiving external commands, and may include a variety of types, such as rubber belt type, metal belt type, and chain type CVTs, an electronic continuous variable transmission (ECVT), a friction disk type, or a conventional iso-axis continuous variable transmission.

The term "common load" refers to a wheel-type vehicle, tracked vehicle, rail vehicle, or ship driven by at least two independent motors, or a conveyor for a stream of people or logistics, or industrial equipment driven by at least two motors. The common load may be further equipped with an engine power system, free wheel, and related operational interface unit.

Figure 1:
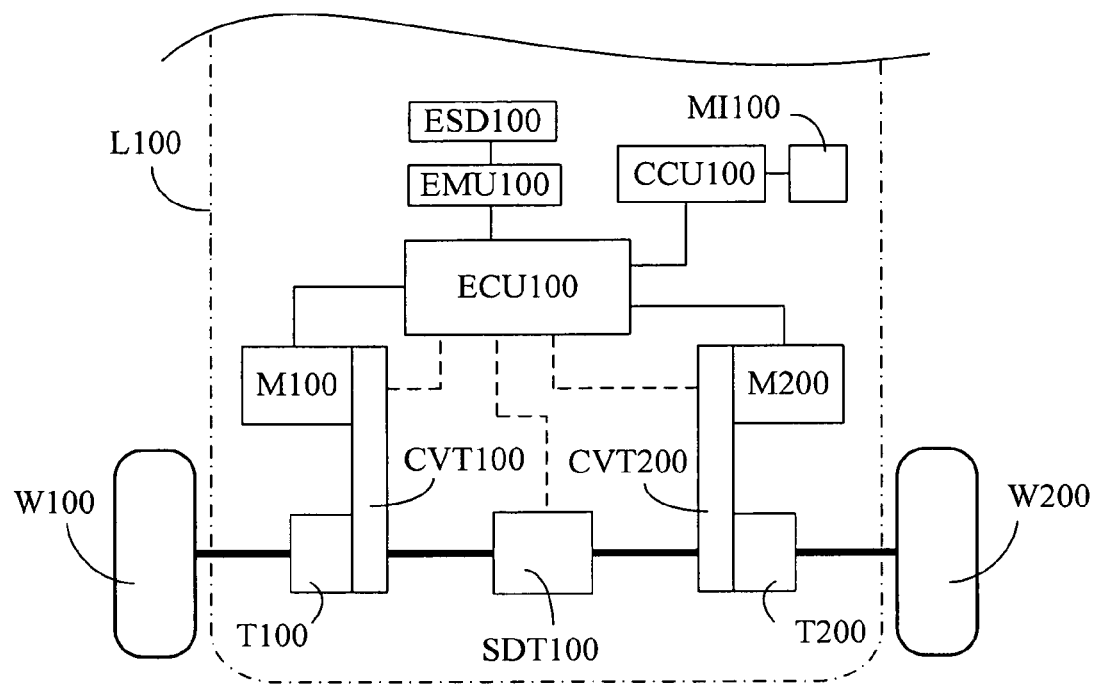
FIG. 1 is a schematic view showing a first preferred embodiment of an individual-powered dual CVT differential system with stabilizing device.

The various embodiments of the present invention are described as follows:

FIG. 1 is a schematic view showing preferred embodiment of the individual-powered dual CVT differential system with stabilizing device of the present invention.

As shown in FIG. 1, the structure is as follows: for the common load body L100, the motor M100 is installed to drive the wheel group W100 placed at the load through the continuous variable transmission CVT100 and the transmission T100, and the motor M200 is installed to drive the wheel group W200 placed at the load through the continuous variable transmission CVT200 and the transmission T200. A stabilizing device is constituted by a torque-limited coupling device with sliding damping. The stabilizing device is installed between the loads individually driven by the two CVTs of the motors, such that if the wheel group W100 and the wheel group W200 placed at the load are driven with speed differential, the continuous variable transmission CVT100 and the continuous variable transmission CVT200 automatically regulate the speed ratio with the load variation to coordinate with the rotation differential between the wheel group W100 and the wheel group W200, and the stabilizing device stabilizes the operation between the loads individually driven by the two CVTs. As shown in FIG. 1:

motors M100, M200: constituted by rotary motors, which may be AC or DC, brushless or brush, synchronous or non-synchronous, or internal or external rotation type motors;

continuous variable transmissions CVT100, CVT200: related to continuous variable transmissions, which can automatically change the speed ratio according to the load state, or change the speed ratio in response to external manipulation, and which may include a variety of types, such as rubber belt type, metal belt type, and chain type CVT, or an electronic continuous variable transmission (ECVT), or a friction disk type, or a conventional iso-axis continuous variable transmission;

stabilizing device SDT100: constituted by dual-end shaft coupling device with the functions of setting coupling torque and sliding damping when exceeding the torque, the stabilizing device having a dual-end shaft structure providing sliding damping by a fluid viscosity effect, fluid damping effect, mechanical friction effect, electromagnetic eddy current effect, or power generation anti-torque effect, in which the two revolution ends individually link between the loads of the continuous variable transmissions CVT100 and CVT200 such that if unstable operation is caused by a varied load at an individual load side during driving operation, the stabilizing device SDT100 installed between the loads operates to stabilize the system;

transmission T100: related to a fixed speed ratio, variable speed ratio, or stepless speed variable transmission, which is constituted by a mechanical gear unit, sprocket unit, pulley unit, or linkage group; the transmission being selectable as needed;

electric control unit ECU100: constituted by an electric machine and/or the solid state power element, and/or an electronic element, and/or a microprocessor, and/or related software, for receiving control by the user interface MI100 and/or the central control unit CCU100, wherein a motor drive control circuit is installed within the electric control unit ECU100 for manipulating rotational speed, torque, rotary direction, and current of the parallel connected motors M100 and M200; or motor drive control circuits individually equipped to the motors M100 and M200 are individually installed within the electric control unit ECU100 for individually manipulating rotational speed, torque, rotary direction, and current of the motors M100 and M200, wherein the motor drive control circuit(s) do not involve any closed loop or semi-closed loop rotational speed control between the two motors to achieve the speed differential function; the speed differential operation between the loads being instead achieved through the continuous variable transmissions installed between the individual motors and loads to perform speed difference regulation;

if a continuous variable transmission which changes the speed ratio by receiving external manipulation is adopted by the system, the electric control unit ECU100 may include a drive control circuit for the continuous variable transmission that allows the external manipulation through the user interface MI100 and/or control by the central control unit CCU100;

electric energy management unit EMU100: constituted by an electrical machine, and/or solid state power element, and/or electronic element, and/or microprocessor, and/ or related software, for controlling the output voltage, the current and the charging voltage and current of the electric storage-discharge unit ESD100, to start and stop charging;

central control unit CCU100: related to an analog or digital, or analog and digital mixed control device, constituted by an electric machine and/or solid state power element, and/or microprocessor, and/or control software, and/or related circuit element, for carrying out commands input through the user interface MI100, and/ or for setting a control mode to further control the operation of the system;

user interface MI100: related to a linear analog digital, or mixed analog and digital control device, constituted by an operating mechanism, and/or electric machine, and/ or solid state circuit, for linking with the central control unit CCU100 to control the operation of the system;

electric storage-discharge unit ESD100: constituted by one or more rechargeable secondary battery, capacitor, or super capacitor.

Through the operation of the above device, if the common load body L100 is driven for operation, and the wheel group W100 and the wheel group W200 operate at differential speeds, the speed ratio is individually regulated according to the load variation between the wheel group W100 and the wheel group W200 to provide a speed differential operation drive between the wheel group W100 and the second wheel group W200, and the stabilizing device SDT100 stabilizes the operation between the loads individually driven by the continuous variable transmission CVT100 and the continuous variable transmission CVT200.

Figure 2:
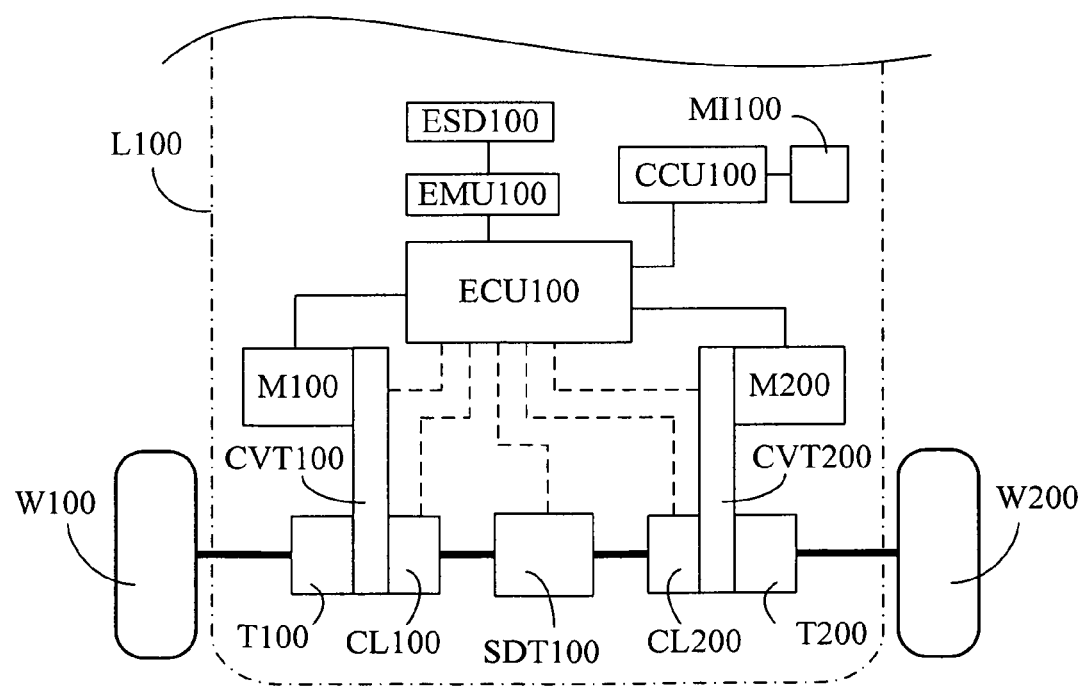
FIG. 2 is a schematic view showing a variation of the preferred embodiment of the individual-powered dual CVT differential system with stabilizing device shown in FIG. 1, additionally installed with clutch units.

In addition, for the embodiment shown in FIG. 1, in addition to directly driving the load through the CVTs, or driving the load through the CVTs and a transmission, a clutch unit CL100 may be additionally installed between the continuous variable transmission CVT100 and the transmission T100, and a clutch unit CL200 may be additionally installed between the continuous variable transmission CVT200 and the transmission T200. FIG. 2 is a schematic view showing an embodiment of the individually-powered dual CVT differential system with stabilizing device in FIG. 1 additionally installed with clutch units.

The clutch units CL100 and CL200 installed between the continuously variable transmission CVT100 and the transmission T100, and between the continuous variable transmission CVT200 and the transmission T200 are used to individually control linking of or cut-off/separation between the continuous variable transmission CVT100 and the transmission T100, and between the continuous variable transmission CVT200 and the transmission T200;

FIG. 2 shows:
clutch units CL100, CL200: related to a clutch device or structure with the function of linking or cut-off, which is driven by manpower, and/or electricity, and/or magnetic power, and/or machine power, and/or gas pressure, and/or liquid pressure, and/or centrifugal force, and which has a rotary input side and a rotary output side;

stabilizing device SDT100: constituted by a dual-end shaft coupling device with the functions of setting coupling torque and sliding damping when exceeding the torque, including a dual-end shaft structure and utilizing a fluid viscosity effect, fluid damping effect, mechanical friction effect, electromagnetic eddy current effect, or power generation anti-torque effect to obtain sliding damping, in which the two revolution ends individually link between the clutch units CL100 and CL200 individually driven by the continuous variable transmissions CVT100 and CVT200 such that during driving operation, if the load at an individual load side varies, if the response time of the clutch units CL100 and CL200 at the loads individually driven by the continuous variable transmissions CVT100 and CVT200 is relatively slow, or if the clutch units CL100 and CL200 operate unstably because of the synchronous response time difference thereof, the stabilizing device SDT100 installed between the loads of the clutch units CL100 and CL200 operates to stabilize the system.

The two or more than two sets of individual-powered dual CVT differential systems with stabilizing device may further be applied to a four- or more-wheel drive system.

Figure 3:
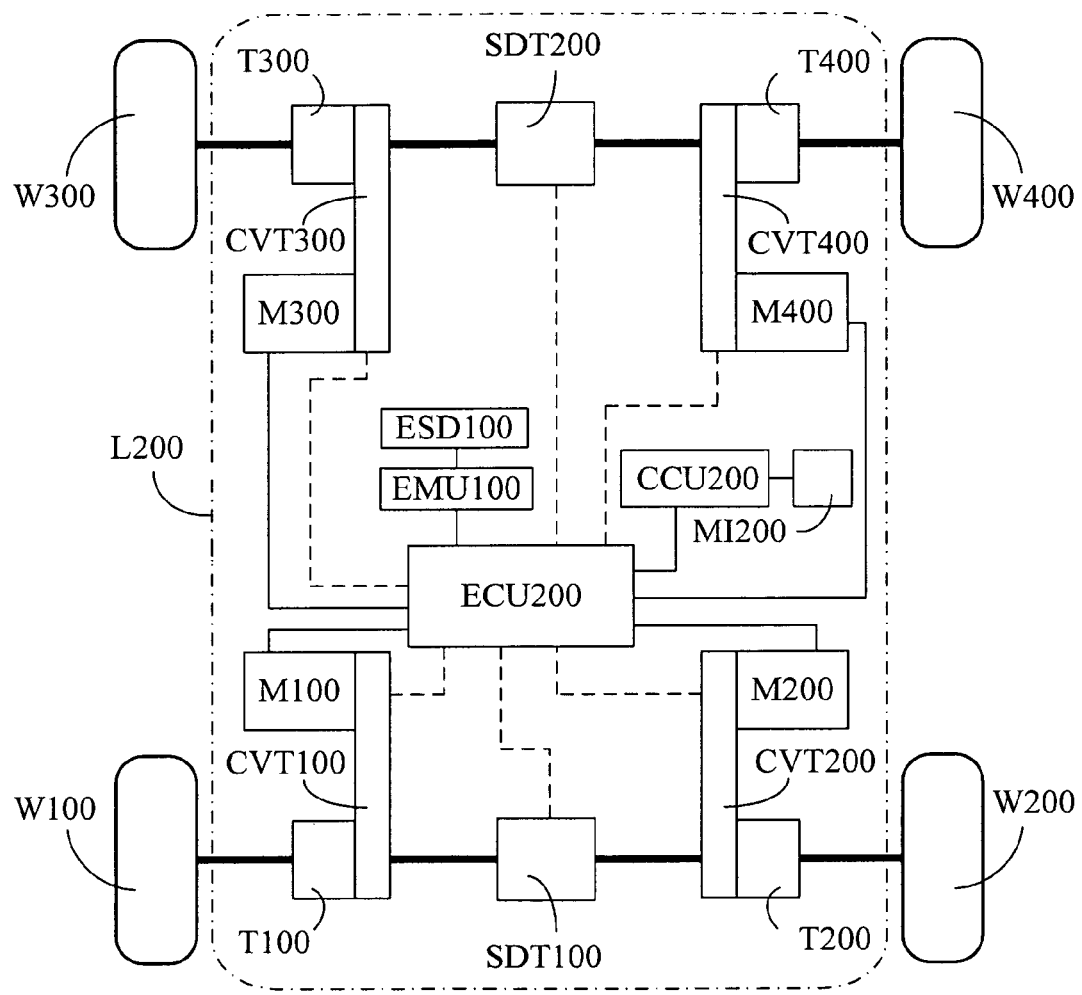
FIG. 3 is a schematic view showing a variation of the preferred embodiment with two sets of the individual-powered dual CVT differential systems and stabilizing device of FIG. 1 installed in a four-wheel drive vehicle or "common load body" L200.

FIG. 3 is a schematic view showing an embodiment having two sets of individually-powered dual CVT differential systems with a stabilizing device of the type shown in FIG. 1, to be installed on a four-wheel drive common load body L200.

As shown in FIG. 3, the main components include:
common load body L200: the common load body L200 is installed with two sets of individually-powered dual CVT differential systems with stabilizing device, in which the first set of the individual-powered dual CVT differential systems with stabilizing device is installed at the front end of the common load body L200, and the second set of the individual-powered dual CVT differential system with stabilizing device is installed at the rear end of the common load body L200, wherein:

the first set of individually-powered dual CVTs with stabilizing device includes:
motors M100, M200: constituted by rotary motors, which may be AC or DC, brushless or brush, synchronous or non-synchronous, or internal or external rotation type motors;

continuously variable transmissions CVT100, CVT200: related to continuously variable transmissions, which can automatically change the speed ratio according to the load state, or change the speed ratio in response to external manipulation, and which may include any of a variety of CVT types, such as rubber belt type, metal belt type, and chain type CVT, or an electronic continuous variable transmission (ECVT), friction disk type, or conventional iso-axis continuous variable transmission; and stabilizing device SDT100: constituted by a dual-end shaft coupling device with the functions of setting coupling torque and sliding damping when exceeding the torque, including a dual-end shaft structure and utilizing a fluid viscosity effect, fluid damping effect, mechanical friction effect, electromagnetic eddy current effect, or power generation anti-torque effect to achieve sliding damping, and in which the two revolution ends individually link the loads of the continuous variable transmissions CVT100 and CVT200 such that if unstable operation is caused by a varied load at an individual load side during driving operation, the stabilizing device SDT100 installed between the loads operates to stabilize the system;

transmissions T100, T200: related to fixed speed ratio, variable speed ratio, or stepless speed variable transmissions, which are constituted by mechanical gear units, sprocket units, pulley units, or linkage groups; and which are selectable as needed;

the second set of individually-powered dual CVTs includes:
motors M300, M400: constituted by rotary motors, which may be AC or DC, brushless or brush, synchronous or non-synchronous, or internal or external rotation type motors;

continuously variable transmissions CVT300, CVT400: related to continuously variable transmissions, which can automatically change the speed ratio according to the load state, or change the speed ratio in response to external manipulation, and which may include a variety of CVT types, such as a rubber belt type, metal belt type, and chain type CVT, an electronic continuously variable transmission (ECVT), a friction disk type, or a conventional iso-axis continuously variable transmission; and stabilizing device SDT200: constituted by a dual-end shaft coupling device with functions of setting coupling torque and sliding damping when exceeding the torque, including a dual-end shaft structure with sliding damping achieved by a fluid viscosity effect, fluid damping effect, mechanical friction effect, electromagnetic eddy current effect, or power generation anti-torque effect, in which the two revolution ends individually link the loads of the continuous variable transmissions CVT300 and CVT400 such that if unstable operation is caused by a varied load at individual load sides during driving operation, the stabilizing device SDT200 installed between the loads operates to stabilize the system;

transmissions T300, T400: related to fixed speed ratio, variable speed ratio, or stepless speed variable transmissions, which are constituted by mechanical gear units, sprocket units, pulley units, or linkage groups;

electric control unit ECU200: constituted by an electric machine and/or solid state power element, and/or electronic element, and/or microprocessor, and/or related software, for receiving control signals from the user interface MI200 and/or the central control unit CCU200, wherein a motor drive control circuit is installed within the electric control unit ECU200 for manipulating the rotational speed, torque, rotary direction, and current of the parallel connected motors M100 and M200, and M300 and M400; or two motor drive control circuits are installed within the electric control unit ECU200, with one motor drive control circuit is used to control the parallel connected motors M100 and M200, including controlling the rotational speed, torque, rotary direction, and current of the motors M100 and M200, and the other motor drive control circuit being used to control the parallel connected motors M300 and M400, including controlling the rotational speed, torque, rotary direction, and current of the motors M300 and M400; or motor drive control circuits are individually arranged for motors M100, M200, M300, and M400 individually installed within the electric control unit ECU200, for individually manipulating rotational speed, torque, rotary direction, and current of the motors M100, M200, M300, and M400, in each example without providing a closed loop or semi-closed loop rotational speed control between the two motors to achieve the speed differential function, the speed differential operation between the loads instead being provided through the continuously variable transmission installed between the individual motors and loads to perform speed difference regulation;

if the continuous variable transmission which changes the speed ratio by receiving external manipulation is adopted by the system, the electric control unit ECU200 includes a drive control circuit for the continuously variable transmissions, the drive control circuit being connected with the user interface MI200 for accepting manual manipulation and/or controlled by the central control unit CCU200;

electric energy management unit EMU100: constituted by an electric machine, and/or solid state power element, and/or electronic element, and/or microprocessor, and/or related software, for controlling the output voltage, the current and the charging voltage and current of the electric storage-discharge unit ESD100, to start and stop the timing of charging;

central control unit CCU200: related to an analog or digital, or mixed analog and digital control device, constituted by an electric machine and/or solid state power element, and/or a microprocessor, and/or control software, and/or related circuit elements, for following commands from the user interface MI200, and/or for setting control modes and further controlling the operation of the system;

user interface MI200: related to a linear analog or digital, or mixed analog and digital control device, constituted by an operating mechanism, and/or electric machine, and/or solid state circuit, for linking with the central control unit CCU200 to control the operations of the first set of individual-powered dual CVT differential systems with stabilizing device, and the second set of individual-powered dual CVT differential systems with stabilizing device in turn; and electric storage-discharge unit ESD100: constituted by at least one rechargeable secondary battery, capacitor, and/or super capacitor.

Figure 4:
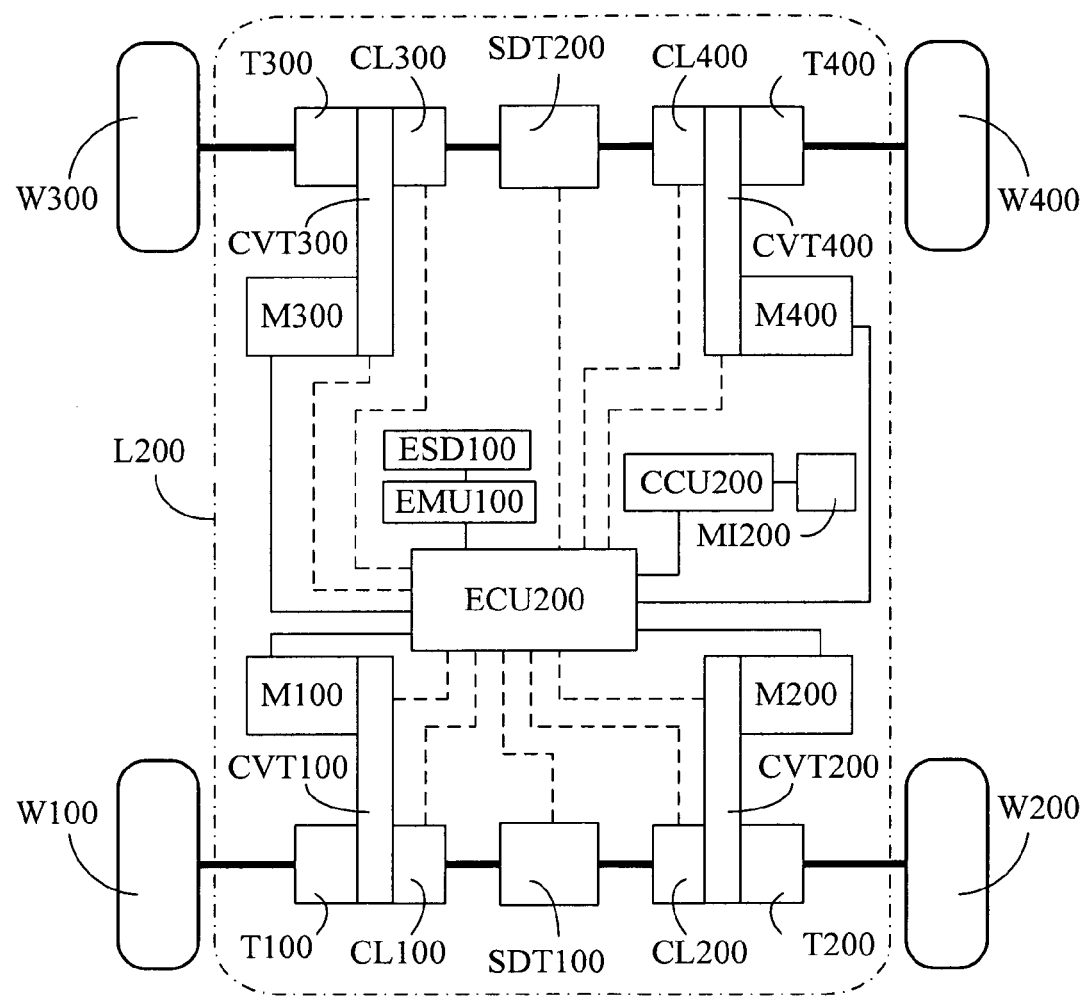
FIG. 4 is a schematic view showing a variation of the embodiment of the system in FIG. 3 additionally installed with clutch units.

In addition, for the embodiment shown in FIG. 3, in addition to directly driving the load through CVT, or driving the load through CVTs and the transmission, a clutch unit CL100 may be additionally installed between the continuously variable transmission CVT100 and the transmission T100, and a clutch unit CL200 may be additionally installed between the continuously variable transmission CVT200 and the transmission T200, and for the second set of the individual-powered dual CVT differential systems with stabilizing device, a clutch unit CL300 may be additionally installed between the continuously variable transmission CVT300 and the transmission T300, and a clutch unit CL400 may be additionally installed between the continuously variable transmission CVT400 and the transmission T400. FIG. 4 is a schematic view showing an embodiment of the system in FIG. 3 with the additionally installed clutch units.

The clutch units CL100 and CL200 installed between the continuously variable transmission CVT100 and the transmission T100, and between the continuously variable transmission CVT200 and the transmission T200, are used to individually control linking or cut-off between the continuously variable transmission CVT100 and the transmission T100, and between the continuously variable transmission CVT200 and the transmission T200.

The clutch units CL300 and CL400 installed between the continuous variable transmission CVT300 and the transmission T300, and between the continuous variable transmission CVT400 and the transmission T400, are used to individually control the linking or cut-off between the continuously variable transmission CVT300 and the transmission T300, and between the continuously variable transmission CVT400 and the transmission T400;

More specifically, the differential system of FIG. 4 is made up of the following elements:

clutch units CL100, CL200, CL300, CL400: related to a clutch device or structure with the function of linking or cut-off/separation, and driven by manpower, and/or electricity, and/or magnetic power, and/or machine power, and/or gas pressure, and/or liquid pressure, and/or centrifugal force, and which has a rotary input side and the rotary output side;

stabilizing device SDT100: constituted by a dual-end shaft coupling device with the functions of setting coupling torque and sliding damping when exceeding the torque, including a dual-end shaft structure that achieves sliding damping by a fluid viscosity effect, fluid damping effect, mechanical friction effect, electromagnetic eddy current effect, or power generation anti-torque effect, in which the two revolution ends individually link the clutch units CL100 and CL200 individually driven by the continuously variable transmissions CVT100 and CVT200 such that if the load at an individual load side varies, if the response time of the clutch units CL100 and CL200 individually driven by the continuously variable transmissions CVT100 and CVT200 is slow, or if the clutch units CL100 and CL200 operate unstably because of the synchronous response time difference thereof, the stabilizing device SDT100 installed between the loads of the clutch units CL100 and CL200 operates to stabilize the system;

stabilizing device SDT200: constituted by a dual-end shaft coupling device with the functions of setting coupling torque and sliding damping when exceeding the torque, including a dual-end shaft structure that achieves sliding damping by a fluid viscosity effect, fluid damping effect, mechanical friction effect, electromagnetic eddy current effect, or power generation anti-torque effect, in which the two revolution ends individually link the clutch units CL300 and CL400 individually driven by the continuously variable transmissions CVT300 and CVT400 such that if the load at an individual load side varies, if the response time of the clutch units CL300 and CL400 at the loads individually driven by the continuous variable transmissions CVT300 and CVT400 is slow, or if the clutch units CL300 and CL400 operate unstably because of the synchronous response time difference thereof, the stabilizing device SDT200 installed between the loads of the clutch units CL300 and CL400 operates to stabilize the system.

The individual-powered dual CVT differential system with stabilizing device may further be applied to a hybrid power drive system.

Figure 5:
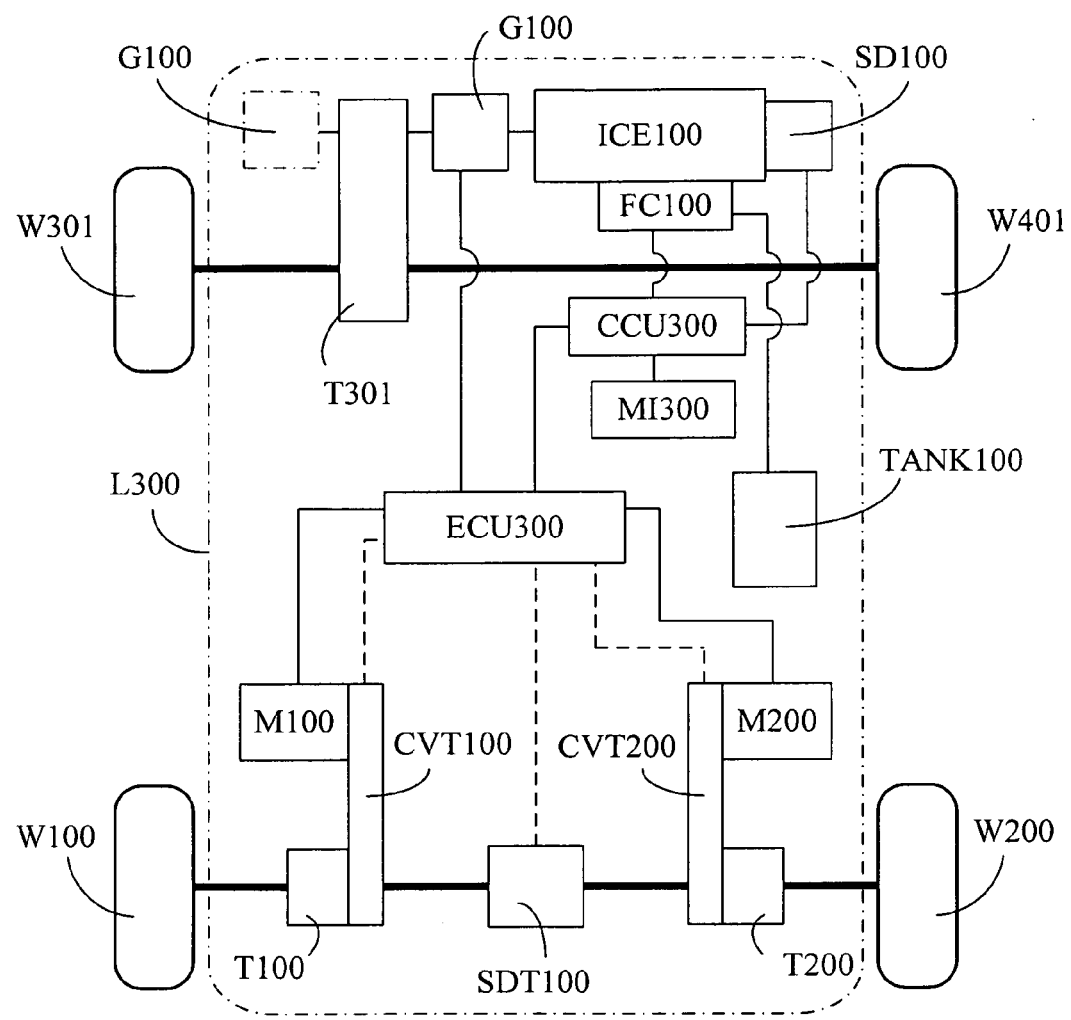
FIG. 5 is a schematic view showing another preferred embodiment of the multi-motor drive system with speed differential regulated by continuous variable transmissions, in which the engine power drive unit and CVTs are simultaneously installed on a common load body L300 to form a hybrid power system.

FIG. 5 is a schematic view showing an embodiment in which a multi-motor drive system with speed differential regulated by the continuously variable transmissions and an engine power drive unit are simultaneously installed on a common load body L300 to form a hybrid power system.

As shown in FIG. 5, the main components include:

common load body L300: one end of the common load being installed with the multi-motor drive system having a speed differential regulated by the continuously variable transmission CVT100 and the continuously variable transmission CVT200;

the other end of the common load body L300 being installed with an engine power system constituted by an engine ICE100 and a transmission T301 with clutch, speed varying, and speed difference functions for driving a wheel group W301 and a wheel group W401 through the transmission T301;

motors M100, M200: constituted by rotary motors, which may be AC or DC, brushless or brush, synchronous or non-synchronous, or internal or external rotation type motors;

generator G100: constituted by a rotary generator, which may be an AC or DC, brushless or brush, synchronous or non-synchronous, or internal or external rotation type generator; in which the generator G100 is installed between the engine ICE100 and the transmission T301, or at the engine ICE100 non-coupling side of the transmission T301, or at the output side of the transmission T301 coupled and driven by the engine ICE 100;

continuously variable transmissions CVT 100, CVT200: related to continuously variable transmissions, which can automatically change the speed ratio according to the load state, or change the speed ratio in receiving external manipulation, and which may include a variety of types of CVT, such as a rubber belt type, metal belt type, and chain type CVT, an electronic continuously variable transmission (ECVT), a friction disk type, or a conventional iso-axis continuously variable transmission; and stabilizing device SDT100: constituted by a dual-end shaft coupling device with functions of setting coupling torque and sliding damping when exceeding the torque, including a dual-end shaft structure that achieves sliding damping by a fluid viscosity effect, fluid damping effect, mechanical friction effect, electromagnetic eddy current effect, or power generation anti-torque effect, in which the two revolution ends individually link the continuously variable transmissions CVT100 and CVT200 such that if unstable operation is caused by a varied load at an individual load side during driving operation, the stabilizing device SDT100 installed between the loads operates to stabilize the system;

electric control unit ECU300: constituted by an electric machine and/or the solid state power element, and/or the electronic element, and/or the microprocessor, and/or related software, for receiving control signals from the user interface MI300 and/or the central control unit CCU300, to control the power generation operation timing of the generator G100 and the voltage and current of the generating power, in which one motor drive control circuit is installed within the electric control unit ECU300 to control the rotational speed, torque, rotary direction, and current of the parallel connected motors M100 and M200; or motor drive control circuits individually equipped to the motors M100 and M200 are individually installed within the electric control unit ECU300 to individually control the rotational speed, torque, rotary direction, and current of the motors M100 and M200, and in which a closed loop or semi-closed loop rotational speed control between the two motors is not required to achieve the speed differential function; the speed differential operation between the loads instead being achieved through the continuously variable transmission installed between the individual motors and loads to perform speed difference regulation.

If continuously variable transmission which changes the speed ratio by receiving external manipulation is adopted by the system, the electric control unit ECU300 may include a drive control circuit for the continuously variable transmission, the drive control circuit being connected with the user interface MI300 for accepting manual manipulation and/or controlled by the central control unit CCU300;

central control unit CCU300: related to an analog or digital, or mixed analog and digital control device, constituted by an electric machine and/or a solid state power element, and/or a microprocessor including control software, and/or a related circuit element, for following commands from the user interface MI300, or for setting a control mode and/or a feedback signal of the engine speed detecting device SD100 to further control the operation of the system;

user interface MI300: related to linear analog or digital, or mixed analog and digital control device, constituted by an operating mechanism, and/or an electric machine, and/or a solid state circuit, for linking with the central control unit CCU300 to control the operation of the multi-motor drive system, with the speed differential being regulated by the continuously variable transmission CVT100 and the continuously variable transmission CVT200, and by the operation of the engine power system;

transmissions T100, T200: related to fixed speed ratio, variable speed ratio, or stepless speed variable transmissions, which are constituted by mechanical gear units, sprocket units, pulley units, or linkage groups; and the transmissions are selectable as needed; and transmission T301: constituted by a transmission component with clutch, and/or speed varying, and/or speed difference functions.

By way of the operations of the above units, if the common load body L300 is driven for operation, and the wheel groups W100 and W200 installed at the load perform speed differential operation, the continuously variable transmission CVT100 and the continuously variable transmission CVT200 individually perform speed ratio regulation according to the load variation of the wheel group W100 and the wheel group W200 installed at the load, to facilitate the speed differential operation drive between the wheel group W100 and the second wheel group W200 installed at the load.

The system is also installed with a required fuel control unit FC100, fuel tank TANK100, and/or engine speed detecting device SD100 for the control of the engine drive operation, as follows:

fuel control unit FC100: related to a power-driven servo unit and/or a mechanical and/or the current force-type drive unit for receiving direct control from the central control unit CCU300 and/or the engine speed detecting device SD100 to control the fuel supply status of the engine ICE100, and to further control the rotational speed and the torque force of the engine ICE100;

tank TANK100: used for engine fuel storage and, through the fuel pipeline and fuel control unit FC100 between the tank TANK100 and the engine ICE100, for controlling the fuel supply to the engine 10E100; and engine speed detecting device SD100: related to an analog or digital rotational speed detecting device, which converts the amount of angular displacement into a corresponding physical signal, and/or substitutes an analog voltage value or frequency value from the generator G100, for transmitting an engine rotational speed signal to the central control unit CCU300, and/or for directly controlling the fuel to the engine from the fuel control unit FC100, the engine speed detecting device SD100 being constituted by a mechanical detecting structure, such as a centrifugal type structure that mechanically interacting with the fuel control unit FC100 to control the operation of the engine ICE100; the type of speed detecting device being selected according to the specific system features.

The hybrid power system constituted by the individual-powered dual CVT differential system with stabilizing device, as shown in FIG. 5, may carry out one or more of the following operational functions:

the power system, driven by the engine ICE100, drives the wheel group W301 and the wheel group W401 to drive the common load body L300; and/or the engine ICE100 operates within the fuel efficient operation range with lower fuel consumption and higher output power to achieve the best fuel consumption, so as to drive the generator G100 to generate power directly, or through the motor drive control circuit installed within the electric control unit ECU300, to control the driving operation of the motor M100 and the motor M200 to drive the common load body L300.

Figure 6:
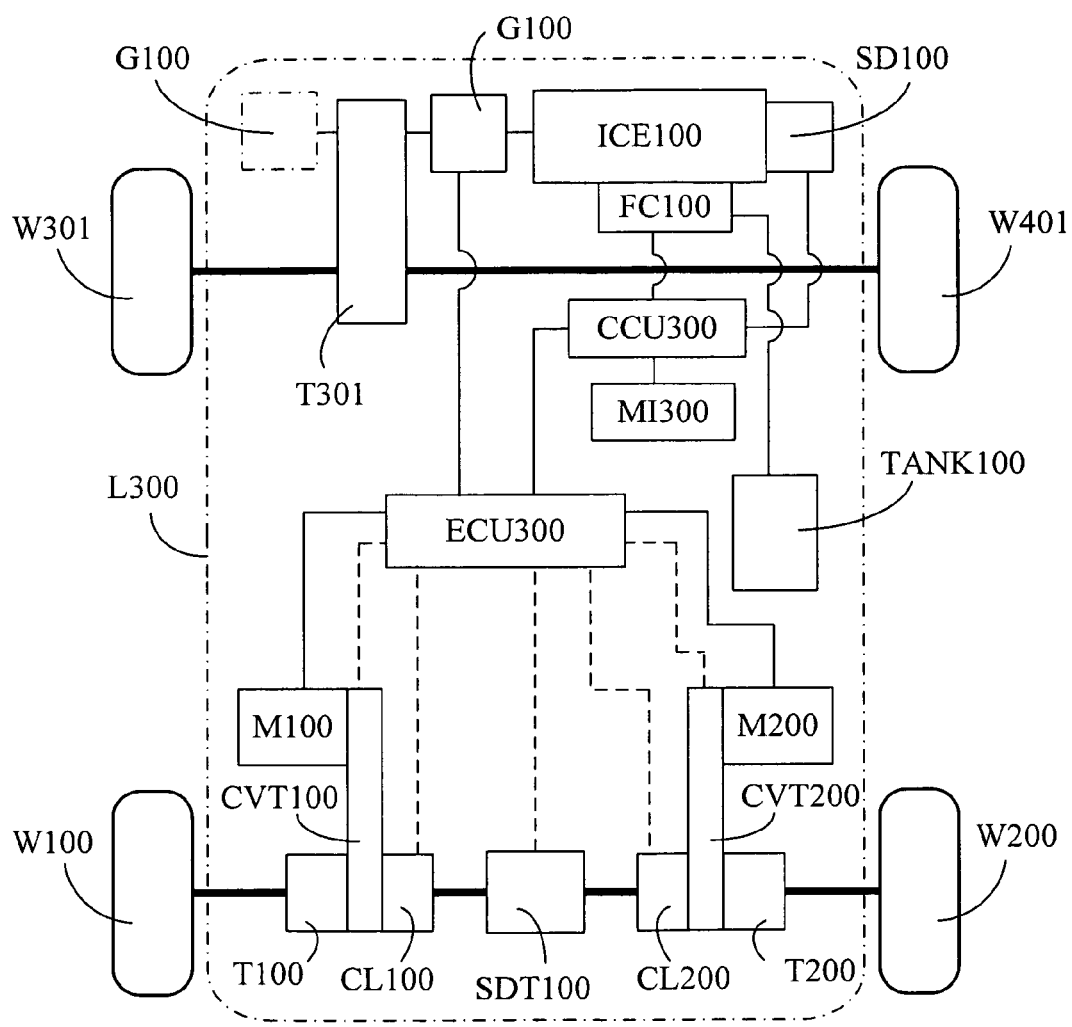
FIG. 6 is a schematic view showing an embodiment of the system of FIG. 5 additionally installed with clutch units.

As shown in FIG. 5, the multi-motor drive system with speed differential regulated by the continuously variable transmission and the engine power drive unit are simultaneously installed at the common load body L300 to constitute a hybrid power system, in which, to achieve a multi-motor drive system with speed differential regulated by the continuously variable transmissions installed on the common load body L300, respective individual loads are directly driven by the continuous variable transmissions, or driven by the continuously variable transmissions and through additional transmissions, and in which a clutch unit CL100 is additionally installed between the continuously variable transmission CVT100 and the transmission T100, and clutch unit CL200 is additionally installed between the continuously variable transmission CVT200 and the transmission T200, to individually control linking or cut-off/separation between the continuous variable transmission CVT100 and the transmission T100, and between the continuous variable transmission CVT200 and the transmission T200. FIG. 6 is a schematic view showing an embodiment of the system in FIG. 5 with the additionally installed clutch units.

FIG. 6 shows:

clutch units CL100, CL200: related to a clutch device or structure with the function of linking or cut-off/separation, which is driven by manpower, and/or electricity, and/or magnetic power, and/or machine power, and/or gas pressure, and/or liquid pressure, and/or centrifugal force, and which has a rotary input side and the rotary output side.

stabilizing device SDT100: constituted by a dual-end shaft coupling device with functions of setting a coupling torque and sliding damping when exceeding the torque, including a dual-end shaft structure that achieves sliding damping by a fluid viscosity effect, fluid damping effect, mechanical friction effect, electromagnetic eddy current effect, or power generation anti-torque effect, and in which the two revolution ends individually link the clutch units CL100 and CL200 individually driven by the continuously variable transmissions CVT100 and CVT200 such that if the load at an individual load side varies, or if the response time of the clutch units CL100 and CL200 at the loads individually driven by the continuously variable transmissions CVT100 and CVT200 is relatively slow, or if the clutch units CL100 and CL200 operate unstably because of the synchronous response time difference thereof, the stabilizing device SDT100 installed between the loads of the clutch units CL100 and CL200 operates to stabilize the system.

The hybrid power system constituted by the individual-powered dual CVT differential system with stabilizing device and the engine power system may further be installed with an electric storage-discharge unit ESD100 to improve operation.

Figure 7:
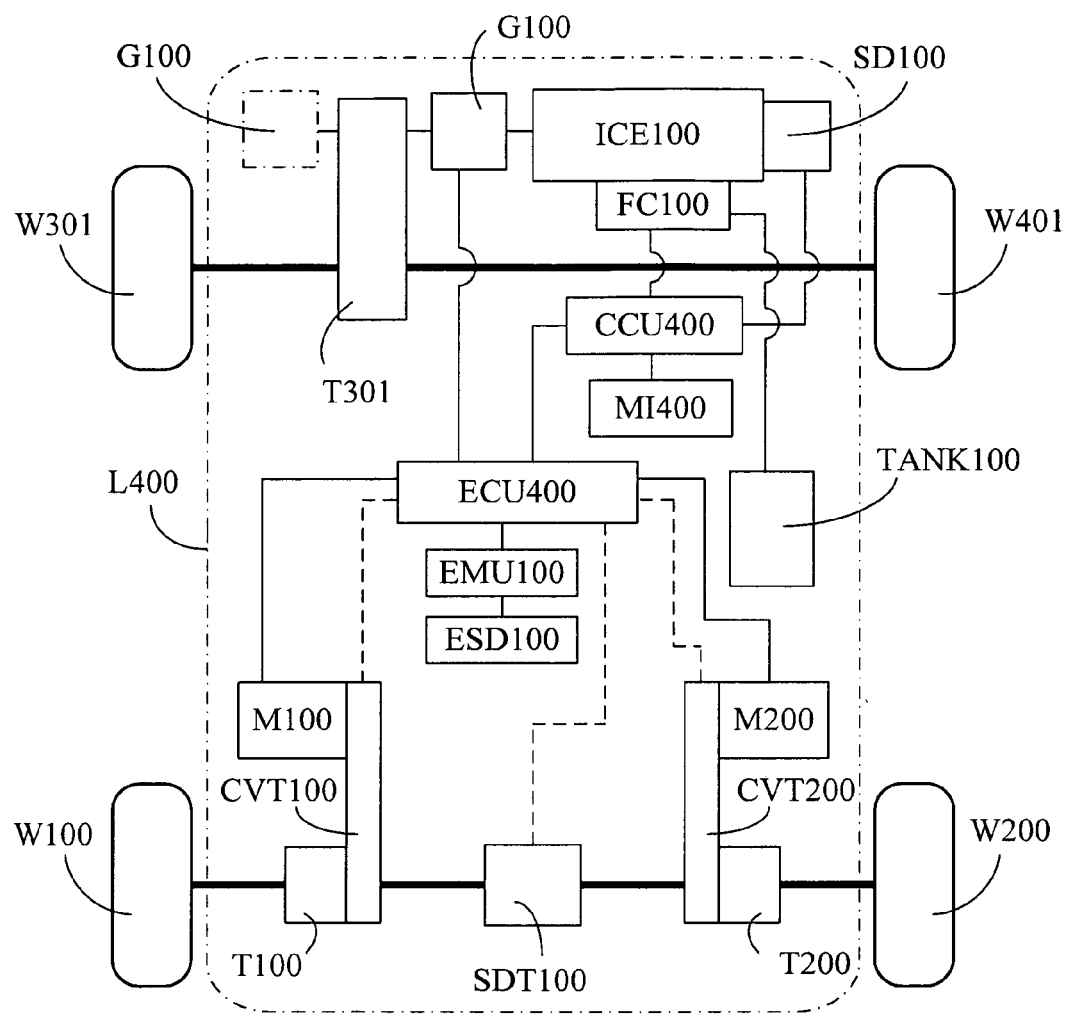
FIG. 7 is a schematic view showing a preferred embodiment of a multi-motor drive system with speed differential regulated by continuous variable transmission, including an engine power drive unit and electric storage-discharge unit ESD100 simultaneously installed on a common load body L400 to form a hybrid power system.

FIG. 7 is a schematic view showing an embodiment of a multi-motor drive system with speed differential regulated by continuously variable transmissions, an engine power drive unit, and an electric storage-discharge unit ESD100 simultaneously installed at a common load body L400 to form a hybrid power system.

As shown in FIG. 7, the electric storage-discharge unit ESD100 is used to receive power generated by the generator G100 driven by the engine ICE100 for charging, and/or to receive regenerated electricity from kinetic energy reclaimed by the motor M100 and/or the motor M200 for charging, and/or to receive power from an external power supply for charging, by way of the power provided by the electric storage-discharge unit ESD100 and/or the power generated by the generator G100, through the motor drive control circuit in the electric control unit ECU400, to control the driving operations of the motor M100 and the motor M200, the components of the system of this embodiment including:

common load body L400: one end of the common load is installed with the multi-motor drive system with speed differential regulated by the continuous variable transmission CVT100 and the continuous variable transmission CVT200;

the other end of the common load body L400 being installed with an engine power system constituted by an engine ICE100 and a transmission T301, with the functions of clutch, speed variation, and speed difference, for driving the wheel group W301 and the wheel group W401 through the transmission T301;

motors M100, M200: constituted by rotary motors, which may be AC or DC, brushless or brush, synchronous or non-synchronous, or internal or external rotation type motors;

generator G100: constituted by a rotary generator, which may be an AC or DC, brushless or brush, synchronous or non-synchronous, or internal or external rotation type generator; and in which the generator G100 is installed between the engine ICE100 and the transmission T301, or at the engine ICE100 non-coupling side of the transmission T301, or at the output side of the transmission T301 coupled and driven by the engine ICE100;

continuously variable transmissions CVT100, CVT200: related to continuously variable transmissions that can automatically change the speed ratio according to the load state, or change the speed ratio in response to external manipulation, and which may include a variety of types of CVT, such as a rubber belt type, metal belt type, and chain type CVT, or an electronic continuously variable transmission (ECVT), or a friction disk type or conventional iso-axis continuous variable transmission; and stabilizing device SDT100: constituted by a dual-end shaft coupling device with functions of setting coupling torque and sliding damping when exceeding the torque, including a dual-end shaft structure that achieves sliding damping by a fluid viscosity effect, fluid damping effect, mechanical friction effect, electromagnetic eddy current effect, or power generation anti-torque effect, and in which the two revolution ends individually link the continuously variable transmissions CVT100 and CVT200 such that if unstable operation is caused by a varied load at an individual load side during driving operation, the stabilizing device SDT100 installed between the loads operates to stabilize the system;

electric control unit ECU400: constituted by an electric machine and/or a solid state power element, and/or an electronic element, and/or a microprocessor, and/or related software, for receiving control signals from the user interface MI400 and/or the central control unit CCU400, to control the power generation operation timing of the generator G100 and the voltage and current of the generating power, in which one motor drive control circuit is installed within the electric control unit ECU400 to control the rotational speed, torque, rotary direction, and current of the parallel connected motors M100 and M200; or motor drive control circuits individually equipped to the motors M100 and M200 are individually installed within the electric control unit ECU400 to individually control the rotational speed, torque, rotary direction, and current of the motors M100 and M200 without involving a closed loop or semi-closed loop speed rotational control between the two motors to achieve the speed differential function; the speed differential operation between the loads instead being provided through the continuously variable transmissions installed between the individual motors and loads to perform speed difference regulation;

if continuously variable transmissions which change the speed ratio by receiving external manipulation are adopted by the system, the electric control unit ECU400 includes drive control circuits for the continuously variable transmissions to implement manual control through the user interface MI400 and/or control by the central control unit CCU400;

electric energy management unit EMU100: constituted by an electric machine and/or a solid state power element, and/or an electronic element, and/or a microprocessor, and/or related software, for controlling the output voltage, the current and the charging voltage and current of the electric storage-discharge unit ESD100, to start and stop the timing of charging;

electric storage-discharge unit ESD100: constituted by one or more rechargeable secondary batteries, capacitors, or super capacitors;

central control unit CCU400: related to an analog or digital, or mixed analog and digital control device, constituted by an electric machine and/or solid state power element, and/or microprocessor including control software, and/or related circuit element, for following commands input through the user interface MI400, or for setting a control mode and/or a feedback signal of the engine speed detecting device SD100 to further control the operation of the system;

user interface MI400: related to a linear analog or digital, or mixed analog and digital control device, constituted by an operating mechanism, and/or electric machine, and/or solid state circuit, for linking with the central control unit CCU400 to control the operation of the multi-motor drive system with speed differential regulated by the continuously variable transmission CVT100 and the continuously variable transmission CVT200, and to control the operation of the engine power system, so as to drive the common load body L400;

transmissions T100, T200: related to fixed speed ratio, variable speed ratio, or stepless speed variable transmissions, which are constituted by mechanical gear units, sprocket units, pulley units, or linkage groups; and the transmissions are selectable as needed; and transmission T301: constituted by a transmission component with clutch, and/or speed variation, and/or speed difference functions.

By way of the operations of the above units, if the common load body L400 is driven for operation, and the wheel groups W100 and W200 installed at the load perform speed differential operation, the continuously variable transmission CVT100 and the continuously variable transmission CVT200 individually perform speed ratio regulation according to the load variation of the wheel group W100 and the wheel group W200 to facilitate speed differential operation between the wheel group W100 and the wheel group W200.

The system is also installed with a required fuel control unit FC100, a fuel tank TANK100, and/or an engine speed detecting device SD100 for control of the engine drive operation, as follows:

fuel control unit FC100: related to a power-driven servo unit and/or a mechanical and/or current force-type drive unit for receiving direct control from the central control unit CCU400 and/or the engine speed detecting device SD100 to control the fuel supply status of the engine ICE100, and to further control the rotational speed and the torque force of the engine ICE100;

fuel tank TANK100: used for engine fuel storage and, through a fuel pipeline and the fuel control unit FC100 between the fuel tank TANK100 and the engine ICE100, for controlling the fuel supply to the engine ICE100; and engine speed detecting device SD100: related to an analog or digital rotational speed detecting device, which converts the amount of angular displacement into a corresponding physical signal, and/or substitutes an analog voltage value or frequency value of the generator G100, for transmitting the engine rotational speed signal to the central control unit CCU400, and/or directly controlling the fuel supplied to the engine from the fuel control unit FC100, the engine speed detecting device SD100 being constituted by a mechanical detecting structure, such as a centrifugal type structure that mechanically interacts with the fuel control unit FC100 to control the operation of the engine ICE100 type engine speed detecting device being selected according to system requirements.

The hybrid power system installed with the electric storage-discharge unit ESD100, as shown in FIG. 7, provides one or more of the following operational functions:

1. the engine power system drives the wheel group W301 and the wheel group W401 to drive the common load body L400;
2. the engine power system drives the wheel group W301 and the wheel group W401 to drive the common load body L400, and to drive the generator G100 for charging the electric storage-discharge unit ESD100 simultaneously;
3. power is supply by the electric storage-discharge unit ESD100 through the motor drive control circuit in the electric control unit ECU400 to control the motor M100 and the motor M200, or kinetic energy is reclaimed and regenerated by the motor M100 and/or the motor M200 for charging back to the electric storage-discharge unit ESD100;
4. power is supplied by the electric storage-discharge unit ESD100 directly, or through the motor drive control circuit in the electric control unit ECU400, to control the motor M100 and the motor M200, so as to drive the wheel group W100 and the wheel group W200, and the engine power system drives the third wheel group W300 and the fourth wheel group W400 for together driving the common load body L400;
5. the engine ICE100 operates within a fuel efficient operation range with lower fuel consumption and higher output power to achieve the best fuel consumption, so as to drive the generator G100 and generate power directly, or to control, through the motor drive control circuit installed within the electric control unit ECU400, the motor M100 and the motor M200 to drive the common load body L400;
6. the electric storage-discharge unit ESD100 receives power generated by the generator G100 driven by the engine ICE 100 for charging, and/or the electric storage-discharge unit ESD100 is charged by an external power supply, and/or the electric storage-discharge unit ESD100 is charged by regenerated power reclaimed and regenerated by the motor M100 and/or the motor M200; and
7. the power of the engine ICE100 individually drives the generator G100 to charge the electric storage-discharge unit ESD100 or to output power externally.

Figure 8:
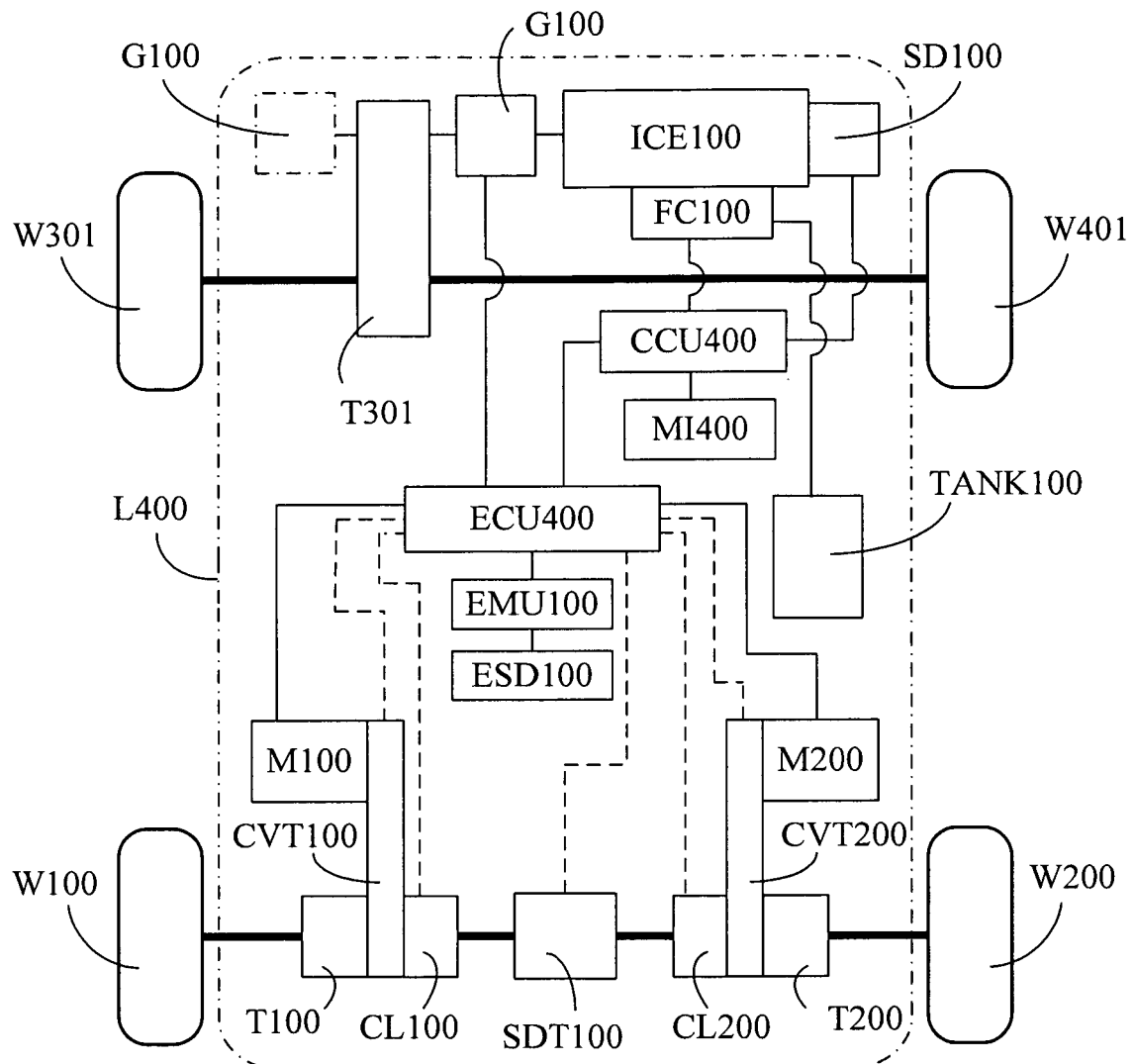
FIG. 8 is a schematic view showing a variation of the preferred embodiment of the system in FIG. 7, additionally installed with clutch units.

The multi-motor drive system with speed differential regulated by continuously variable transmissions and the engine power drive unit shown in FIG. 7 is installed on a common load body L400, with individual loads being directly driven by the continuously variable transmissions, or driven by the continuously variable transmissions and additional transmissions T100 and T200, and may further include a clutch unit CL100 installed between the continuous variable transmission CVT100 and the transmission T100, and a clutch unit CL200 installed between the continuous variable transmission CVT200 and the transmission T200, to individually control linking or cut-off/separation between the continuous variable transmission CVT100 and the transmission T100, and between the continuous variable transmission CVT200 and the transmission T200. FIG. 8 is a schematic view showing an embodiment of the system in FIG. 7 with the additionally installed clutch units;

In particular, FIG. 8 shows:
clutch units CL100, CL200: related to a clutch device or structure with a function of linking or cut/off/separation achieved by manpower, and/or electricity, and/or magnetic power, and/or machine power, and/or gas pressure, and/or liquid pressure, and/or centrifugal force, and which has a rotary input side and the rotary output side.
stabilizing device SDT100: constituted by a dual-end shaft coupling device with the functions of setting coupling torque and sliding damping when exceeding the torque, including a dual-end shaft structure that executes sliding damping by a fluid viscosity effect, fluid damping effect, mechanical friction effect, or electromagnetic eddy current effect or power generation anti-torque effect, and in which the two revolution ends individually link the clutch units CL100 and CL200 individually driven by the continuously variable transmissions CVT100 and CVT200, wherein if the load at an individual load side varies, or if the response time of one the clutch units CL100 and CL200 is relatively slow, or if the clutch units CL100 and CL200 operate unstably because of the synchronous response time difference thereof, the stabilizing device SDT100 installed between the loads of the clutch units CL100 and CL200 operates to stabilize the system.

The invention claimed is:

1. An individually-powered dual CVT differential system with a stabilizing device, comprising:
   a first individual motor (M100) and a second individual motor (M200);
   a first continuously variable transmission (CVT100) and a second continuously variable transmission (CVT200) arranged to automatically change a respective speed ratio according to a load state on a respective first wheel group (W100) and second wheel group (W200), each said continuously variable transmission (CVT100, CVT200) having a first end connected to receive power from a respective one of the first and second individual motors (M100, M200);
   a stabilizing device (SDT100) made up of a dual-end shaft coupling device connected between a second end of the first continuously variable transmission (CVT100) and a second end of the second continuously variable transmission (CVT200), said stabilizing device setting a coupling torque and providing a sliding damping effect caused by fluid viscosity, fluid damping, mechanical friction, electromagnet eddy current damping, or power generation anti-torque effect, when the set coupling torque is exceeded to stabilize the differential system in case of unstable operation caused by varied loads at individual load sides during driving operation; and
   an electronic control unit (ECU100, ECU200, ECU300, or ECU400) connected to a user interface (MI100, MI200, MI300, or MI400) and/or central control unit (CCU100, CCU200, CCU300, or CCU400) for controlling at least one of a rotational speed, torque, rotary direction, and current of each of the first and second individual motors (M100, M200),
   wherein a speed differential operation between first and second wheel groups (W100, W200) is carried out by said first and second continuously variable transmissions (CVT100, CVT200) rather than by feedback control by the electronic control unit (ECU100) of the rotational speed of the respective first and second individual motors (M100, M200).

2. An individually-powered dual CVT differential system with a stabilizing device as claimed in claim 1, further comprising at least one transmission (T100, T200) connected between the second end of one of the first and second continuously variable transmissions (CVT100, CVT200) and a respective one of the wheel groups (W100, W200), said at least one transmission (T100, T200) including at least one of: (a) a mechanical gear unit, (b) sprocket unit, (c) pulley unit, and (d) linkage group to form a fixed speed ratio transmission, variable speed ratio, or stepless speed variable transmission.

3. An individually-powered dual CVT differential system with a stabilizing device as claimed in claim 1, wherein said first and second individual motors (M100, M200) are selected from the group consisting of AC or DC, brushed or brushless, synchronous or non-synchronous, and internal or external rotation-type electric motors.

4. An individually-powered dual CVT differential system with a stabilizing device as claimed in claim 1, wherein the first and second continuously variable transmissions (CVT100, CVT200) each include one of: (a) a non-coaxial continuously variable transmission having a rubber belt, metal belt, or chain, (b) an electronic continuously variable transmission (ECVT), and (c) a friction disc continuously variable transmission.

5. An individually-powered dual CVT differential system with a stabilizing device as claimed in claim 1, wherein the first and second wheel groups (W100, W200) are at two sides of a common body (L100).

6. An individually-powered dual CVT differential system with a stabilizing device as claimed in claim 1, further comprising an electric storage-discharge unit (ESD100) for supplying electrical power to said electronic control unit (ECU100) and said first and second individual motors (M100, M200), and an electronic energy management unit (EMU100) for controlling an output voltage and current, and a charging voltage and current, for said electric storage-discharge unit (ESD100).

7. An individually-powered dual CVT differential system with a stabilizing device as claimed in claim 1, further comprising first and second clutch units (CL100, CL200) installed between the stabilizing device (SDT100) and respective said second ends of the first and second continuously variable transmissions (CVT100, CVT200), said first and second clutch units being controlled manually or by centrifugal force to selectively couple the stabilizing device (SDT100) to at least one of the continuously variable transmissions (CVT100, CVT200) when individual load states on said wheel groups (W100, W200) vary or a synchronous response time difference exists between the load states on respective sides of the stabilizing device.

8. An individually-powered dual CVT differential system with a stabilizing device as claimed in claim 1, further comprising a third continuously variable transmission (CVT300), a fourth continuously variable transmission (CVT400), and a second stabilizing device (SDT200) connected between the respective second ends of the third and fourth continuously variable transmissions (CVT300, CVT400), each of the third and fourth continuously variable transmissions having a first end connected to receive power from a respective third individual motor (M300) and fourth individual motor (M400) and a second end connected to a respective third wheel group (W300) and fourth wheel group (W400) through a respective third transmission (T300) and fourth transmission (T400), wherein a speed differential operation between said first, second, third, and fourth wheel groups (W100, W200, W300, W400) is carried out by said first, second, third, and fourth continuously variable transmissions (CVT100, CVT200, CVT300, CVT400) rather than by feedback control by the electronic control unit (ECU100) of the rotational speed of the respective first, second, third, and fourth individual motors (M100, M200, M300, M400).

9. An individually-powered dual CVT differential system with a stabilizing device as claimed in claim 8, further comprising a clutch unit (CL300) connected between the second stabilizing device (SDT200) and the second end of the third continuously variable transmission (CVT300), and a clutch unit (CL400) connected between the second stabilizing device (SDT200) and the second end of the fourth continuously variable transmission device (CVT400).

10. An individually-powered dual CVT differential system with a stabilizing device as claimed in claim 8, wherein said first and second wheel groups (W100, W200) are at one end of a common load body (L100), and said third and fourth wheel groups (W300, W400) are at a second end of the common load body (L100).

11. An individually-powered dual CVT differential system with a stabilizing device as claimed in 1, further comprising:
- a third wheel group (W301) and a fourth wheel group (W401) driven by an engine (ICE100) through a transmission (T301);
- a generator (G100) driven by the engine (ICE100) and connected to the electronic control unit (ECU300) for supplying electrical power to the first and second individual motors (M100, M200) under control of the electronic control unit (ECU300), the central control unit (CCU300), and the user interface (MI300);
- a fuel control unit (FC100) connected to the central control unit (CCU300) for controlling supply of fuel from a fuel supply (TANK100) to the engine (ICE100), said fuel control unit being controlled directly by the central control unit (CCU300) and/or in response to signals from an engine speed detector (SD100).

12. An individually-powered dual CVT differential system with a stabilizing device as claimed in claim 11, wherein said system constitutes a hybrid power system having the following operational functions:
- (a) the engine (ICE101) drives the third and fourth wheel groups (W301) and W401) to drive a common body (L300);
- (b) the engine (ICE100) drives the generator (G100) to control driving operation of the first and second individual motors (M100, M200), either directly or through a motor drive control circuit in the electronic control unit (ECU300), to drive the common body (L300) by driving the first and second wheel groups (W100, W200); and
- (c) the common body is driven by a combination of operational functions (a) and (b).

13. An individually-powered dual CVT differential system with a stabilizing device as claimed in claim 11, further comprising first and second clutch units (CL100, CL200) installed between the stabilizing device (SDT100) and respective said second ends of the first and second continuously variable transmissions (CVT100, CVT200), said first and second clutch units being controlled manually or by centrifugal force to selectively couple the stabilizing device (SDT100) to at least one of the continuously variable transmissions (CVT100, CVT200) when individual load states on said wheel groups (W100, W200) vary or a synchronous response time difference exists between the load states on respective sides of the stabilizing device.

14. An individually-powered dual CVT differential system with a stabilizing device as claimed in claim 13, further comprising an electric storage-discharge unit (ESD100) for supplying electrical power to said electronic control unit (ECU100) and said first and second individual motors (M100, M200), and an electronic energy management unit (EMU100) for controlling an output voltage and current, and a charging voltage and current, for said electric storage-discharge unit (ESD100).

15. An individually-powered dual CVT differential system with a stabilizing device as claimed in claim 11, further comprising an electric storage-discharge unit (ESD100) for supplying electrical power to said electronic control unit (ECU100) and said first and second individual motors (M100, M200), and an electronic energy management unit (EMU100) for controlling an output voltage and current, and a charging voltage and current, for said electric storage-discharge unit (ESD100).

16. An individually-powered dual CVT differential system with a stabilizing device as claimed in claim 15, wherein said system constitutes a hybrid power system having the following operational functions:

(a) the engine (ICE101) drives the third and fourth wheel groups (W301) and W401) to drive a common body (L300);

(b) the engine (ICE100) drives the third and fourth wheel groups (W301) and (W401) and also to drive the generator (G100) to charge the electric storage-discharge unit (ESD100);

(c) the electric storage-discharge unit (ESD100) supplies power to the first and second individual motors (M100, M200) directly or through the electronic control unit (ECU400) to drive the first and second wheel groups (W100, W200), and kinetic energy is reclaimed and regenerated by the first and second individual motors (M100, M200) for charging the electric storage-discharge unit (ESD100);

(d) the engine (ICE100) drives the third and fourth wheel groups (W301, W401) and the electric storage-discharge unit (ESD100) supplies power to the first and second individual motors (M100, M200) to drive the first and second wheel groups (W100, W200), said engine (ICE100) and first and second individual motors (M100, M200) thereby jointly driving a common body (L400);

(e) the engine (ICE100) drives the generator (G100) to supply power to the first and second individual motors (M100, M200) to drive the common body through the first and second wheel groups (W100, W200);

(f) the engine (ICE100) drives the generator (G100) to charge the electric storage-discharge unit (ESD100) and kinetic energy is reclaimed and regenerated by the first and second individual motors (M100, M200) to also charge the electric storage-discharge unit (ESD100); and (g) the engine (ICE100) drives the generator (G100) to charge the electric storage-discharge unit (ESD100) and drive the third and fourth wheel groups (W300, W400).

* * * * *